Sept. 18, 1923.
W. R. MACKEY
AIR HOSE STAND
Filed Oct. 15, 1921
1,468,538
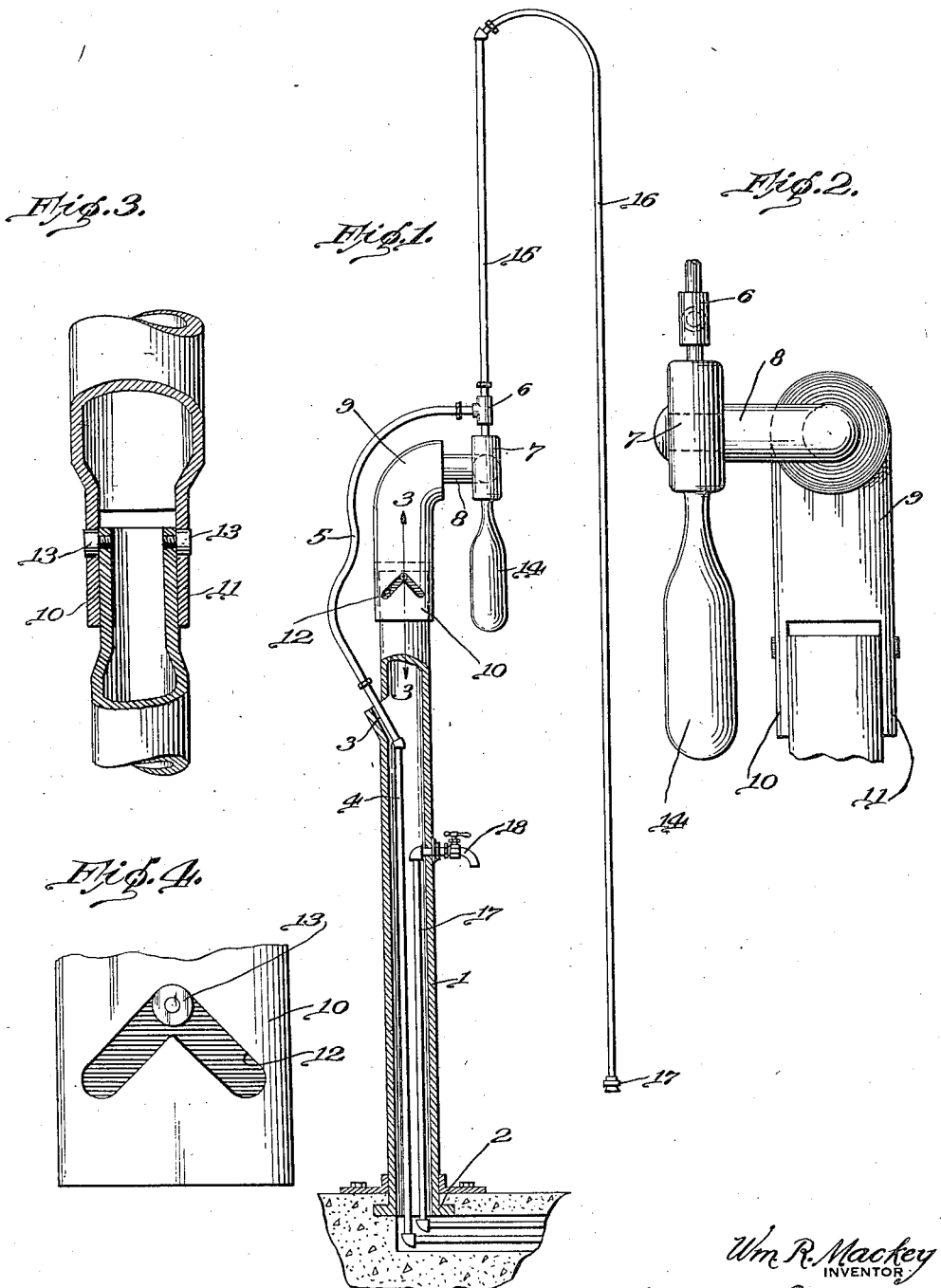

Patented Sept. 18, 1923.

1,468,538

UNITED STATES PATENT OFFICE.

WILLIAM R. MACKEY, OF MONROE, WISCONSIN.

AIR-HOSE STAND.

Application filed October 15, 1921. Serial No. 507,829.

*To all whom it may concern:*

Be it known that I, WILLIAM R. MACKEY, a citizen of the United States, residing at Monroe, in the county of Green and State of Wisconsin, have invented new and useful Improvements in Air-Hose Stands, of which the following is a specification.

This invention relates to an air hose stand particularly designed for use at automobile service stations and an object of the invention is to provide a stand from which air may be obtained for filling tires of a motor vehicle or for analogous uses which embodies a weighted flexible structure to permit bending of the stand for proper connection with various tires of a motor vehicle which structure is designed so that when the device is released the stand will automatically assume its normal vertical position.

Another object of this invention is to provide an air hose stand as specified which embodies a movable head carried by the stand structure to permit rotary movement of the head relative to the stand, which head pivotally carries a weighted coupling structure to permit pivotal movement in a direction opposite to the movement of the head and a device which further embodies a flexible hose carried by the coupling and adapted for connection with the valves of inflatable bodies.

Other objects of the invention will appear in the following detailed description and in the accompanying drawings wherein:

Fig. 1 is a side elevation, partly in section, of the improved stand.

Fig. 2 is a fragmentary elevation of the head structure taken at right angles to Fig. 1.

Fig. 3 is a detail section on the line 3—3 of Fig. 1.

Fig. 4 is an enlarged fragmentary elevation showing the manner of connecting the head to the stand structure.

Referring more particularly to the drawing the improved air hose stand comprises a pipe standard 1 the lower end of which is embedded in the ground in any suitable manner as indicated at 2. The standard 1 has a branch 3 formed thereon, the upper end of which is open and through which the air supply pipe 4 extends. The air supply pipe 4 extends downwardly through the standard 1 and is adapted to have connection with any suitable supply source of compressed air. A flexible hose 5 is connected to the upper end of the pipe 4 and is also connected to a coupling 6 carried by the pivoted member 7. The member 7 is pivotally mounted upon the stem 8 formed upon the head 9 of the standard 1. The lower end of the head 9 telescopes over the upper end of the standard 1 and is provided with substantially inverted V shaped slots 12 in which rollers 13 ride. The rollers 13 are carried by the upper ends of the standard 1 and when the head 9 is in a vertical position the rollers rest in the apices of the slots 12, however, when the head 9 is rotated in either direction the rollers ride downwardly in the branches of the slots permitting the head to be rotated relative to the standard 1 in two directions. The cam action of the rollers 13 against the angled sides of the slots together with the weight of the head will cause the head to assume its normal position when released after having been rotated.

The member 7 has a weight 14 depending therefrom for normally maintaining it in its upright position. The coupling 6 has a length of pipe 15 connected thereto to which a flexible hose 16 is connected. The hose 16 has any approved type of automatic valve 17 carried thereby to permit air to flow from the hose when connected with the valve of an inflatable body. The member 7 is mounted for pivotal movement in a direction opposite to the direction of pivotal movement of the head 9 thereby providing a substantial universal joint which will permit the air hose 16 to be moved over a relatively wide area for connection with the air valves of the inner tubes of motor vehicle wheels.

A water supply pipe 17 extends upwardly through the standard 1 and outwardly therethrough intermediate the ends of the standard having a faucet 18 thereon by means of which water may be obtained.

It is, of course, to be understood that the invention may be constructed in various other manners and the parts associated in other relations; therefore, I do not desire to be limited in any manner except as set forth in the claims hereunto appended.

Having thus described my invention what I claim is:

1. An air hose stand comprising a standard having a pair of rollers projecting from opposite sides thereof, a head having a pair of inverted V shaped slots each receiving a roller, a stem projecting from the head and to one side of the head, a hose, weighted pivotal connection between one end of the hose and said stem.

2. An air hose stand comprising a standard, a head mounted for vertical sliding movement on the upper end of the standard and provided with a pair of inverted V shaped slots, rollers rotatably connected to the standard and movable in the slots, an L shaped stem having one end connected to the head, a vertical tube having its lower end weighted and pivotally connected to the other end of the stem, an air pipe connected to the tube adjacent its lower end, and a hose connected to the upper end of the tube.

In testimony whereof I affix my signature.

WILLIAM R. MACKEY.